US006907082B1

(12) United States Patent
Loechner

(10) Patent No.: US 6,907,082 B1
(45) Date of Patent: Jun. 14, 2005

(54) 4-20 MA INTERFACE CIRCUIT

(75) Inventor: Michael Loechner, Filderstadt (DE)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/496,667

(22) Filed: Feb. 3, 2000

Related U.S. Application Data

(60) Provisional application No. 60/118,347, filed on Feb. 3, 1999.

(51) Int. Cl.[7] .......................................... H04L 25/00
(52) U.S. Cl. .................. 375/257; 375/377; 251/129.01; 700/289
(58) Field of Search ................................ 375/257, 377; 251/129.01, 129.04; 700/289

(56) References Cited

U.S. PATENT DOCUMENTS 5,502,999 A 4/1996 Seberger et al.
5,533,544 A 7/1996 Good et al.
5,804,696 A 9/1998 Seberger et al.
6,026,352 A * 2/2000 Burns et al. ................ 702/182

* cited by examiner

*Primary Examiner*—Dac V. Ha
(74) *Attorney, Agent, or Firm*—Fish & Richardson P.C.

(57) ABSTRACT

A 4–20 mA interface circuit for use, for example, in a valve controller, communicates with a two-wire loop. The interface circuit includes a power extraction circuit connected to the two-wire loop and operable to generate a DC operating voltage for use in powering the interface circuit and a related device, the power extraction circuit including a DC-to-DC converter that generates the DC operating voltage as a voltage having a smaller magnitude than a voltage between the two wires of the two-wire loop. The circuit also includes a current sensor connected to the two-wire loop and operable to generate a measure of an analog current through the two-wire loop, the measure being used in controlling a device associated with the interface circuit, and a digital communications circuit connected to the two-wire loop. The digital communications circuit is operable to inject a digital transmission signal on to the two-wire loop and to extract a digital reception signal from the two-wire loop. The digital communications circuit includes an impedance controller having an operational amplifier connected to control an impedance presented to the two-wire loop by the interface circuit.

9 Claims, 24 Drawing Sheets

PIN NAMES

I_Motor-\I
I_Motor\I
LED_Enb+\I
LED_End+I
Motor_Ctr\I
U_Motor\I
U_MOTOR\I
Motor_WD\I
Motor_WD\I
Senso=S\I
LED<4..1>\I
PWMOut\I
DAC_LD+\I
ADCRDY+\I
ADC_Rst+\I
ADC_CLK\I
SPISO\I
SPISI\I
SPICk\IDACEnb+\I
ADCEnb+\I
Up2<4..1>\I
Up1<4..1>\I
PosMI-\I
PosMI+\I
Ain-\I
Ain+\I
MD+\I
MD+\I
LED<4..1>\I
Uref\I

4-20 MA INTERFACE CIRCUIT

CROSS REFERENCE TO RELATED APPLICATION

This application claims priority from U.S. Provisional Application No. 60/118,347, which was filed on Feb. 3, 1999, and is incorporated by reference.

TECHNICAL FIELD

This invention relates to industrial control systems, and more particularly to a circuit for interfacing with a pair of wires that provides the circuit with power, an analog current control signal, and bi-directional digital communications.

BACKGROUND

In industrial control systems, it is known to control an instrument, such as a valve controller, using a 4–20 mA DC signal supplied by a control system on a single pair of wires. Typically, the single pair of wires also provides electrical power to the instrument.

It is also known to superimpose bi-directional digital communications signals on the pair of wires. To achieve such communications, the instrument may include a variable impedance line interface circuit that maintains a low impedance at frequencies below 25 Hz to accommodate 4–20 milliamp analog signal variations without substantial terminal voltage fluctuation while also maintaining a substantially higher and relatively constant impedance across the frequency band (e.g., 500–5000 Hz) used for the digital communications.

The HART protocol is one known protocol for providing a 4–20 mA analog control signal in conjunction with bi-directional digital communications. The HART protocol achieves simultaneous analog and digital transmission by using a frequency shift keying (FSK) method to overlay a bi-directional digital signal on the analog control signal.

SUMMARY

In one general aspect, the invention features a 4–20 mA input interface circuit for communicating with a two-wire loop. The interface circuit includes a power extraction circuit connected to the two-wire loop and operable to generate a DC operating voltage for use in powering the interface circuit and a related device. The power extraction circuit includes a DC-to-DC converter that generates the DC operating voltage as a voltage having a smaller magnitude than a voltage between the two wires of the two-wire loop. The interface circuit also includes a current sensor connected to the two-wire loop and operable to generate a measure of an analog current through the two-wire loop, the measure being used in controlling a device associated with the interface circuit. Finally, the interface circuit includes a digital communications circuit connected to the two-wire loop and operable to inject a digital transmission signal on to the two-wire loop and to extract a digital reception signal from the two-wire loop. The digital communications circuit includes an impedance controller having an operational amplifier connected to control an impedance presented to the two-wire loop by the interface circuit.

Embodiments may include one or more of the following features. For example, the impedance controller may be operable to present a stable impedance to the two-wire loop for frequencies in a digital communications band that may extend, for example, from 500 Hz to 10 kHz. The impedance controller also may present an impedance substantially less than the stable impedance for frequencies outside of the digital communications band. The impedance in the digital communications band may be between 200 and 300 ohms, and may be, for example, 250 ohms.

The impedance controller may be operable to inject the digital transmission signal without reducing the impedance substantially below the stable impedance. This permits the interface circuit to operate without separate modes for transmission and receipt of digital communications signals.

The impedance controller may include a filter connected to one or more inputs of the operational amplifier.

In another general aspect, the invention features a valve controller having a 4–20 mA interface circuit having terminals for connection to a two-wire loop, a processor in data communication with the interface circuit and operable to generate a control signal for controlling a valve position, and a control device operable to control the valve position in response to the control signal from the processor. The 4–20 mA interface circuit includes a power extraction circuit connected to the two-wire loop and operable to generate a DC operating voltage for use in powering the interface circuit and the processor, a current sensor connected to the two-wire loop and operable to generate a measure of an analog current through the two-wire loop, the measure being used in controlling a device associated with the interface circuit, and a digital communications circuit connected to the two-wire loop and operable to inject a digital transmission signal on to the two-wire loop and to extract a digital reception signal from the two-wire loop. The digital communications circuit includes an impedance controller having an operational amplifier connected to control an impedance presented to the two-wire loop by the interface circuit.

Other features and advantages will be apparent from the description and drawings, and from the claims.

DETAILED DESCRIPTION

Figure 1:
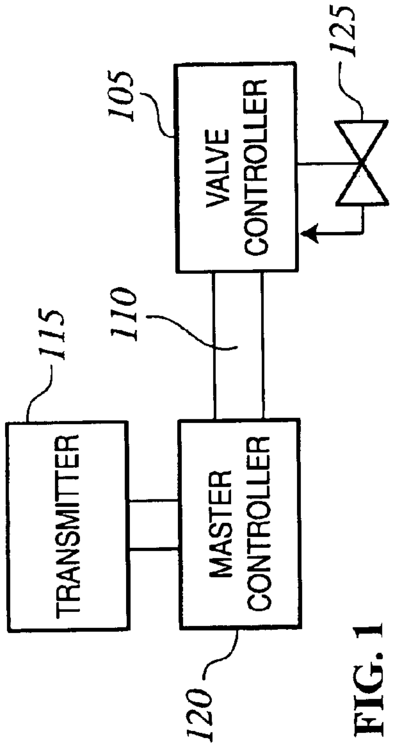
FIG. 1 is a block diagram of a system including a valve controller.

FIG. 1 illustrates a system 100 including a valve controller 105 that includes a 4–20 mA interface circuit. As shown, the valve controller 105 receives a set value (w) from a two-wire control loop 110, with the set value (w) being in the form of an analog current that varies between 4 and 20 mA. The system 100 also may include, for example, a transmitter 115 and a master controller 120.

The valve controller 105 generates a pneumatic pressure that controls a valve 125. The set value (w) supplied to the valve controller indicates the desired position of the valve. The pneumatic pressure generated by the valve controller determines the position of the valve 125. The position of the valve 125 is, in turn, sensed by the valve controller 105, which compares the desired valve position (as indicated by set value w) to the actual valve position, and adjusts the pneumatic pressure accordingly until the two match. In some implementations, a separate pneumatic actuator may interconnect the valve controller and the valve.

Figure 2:
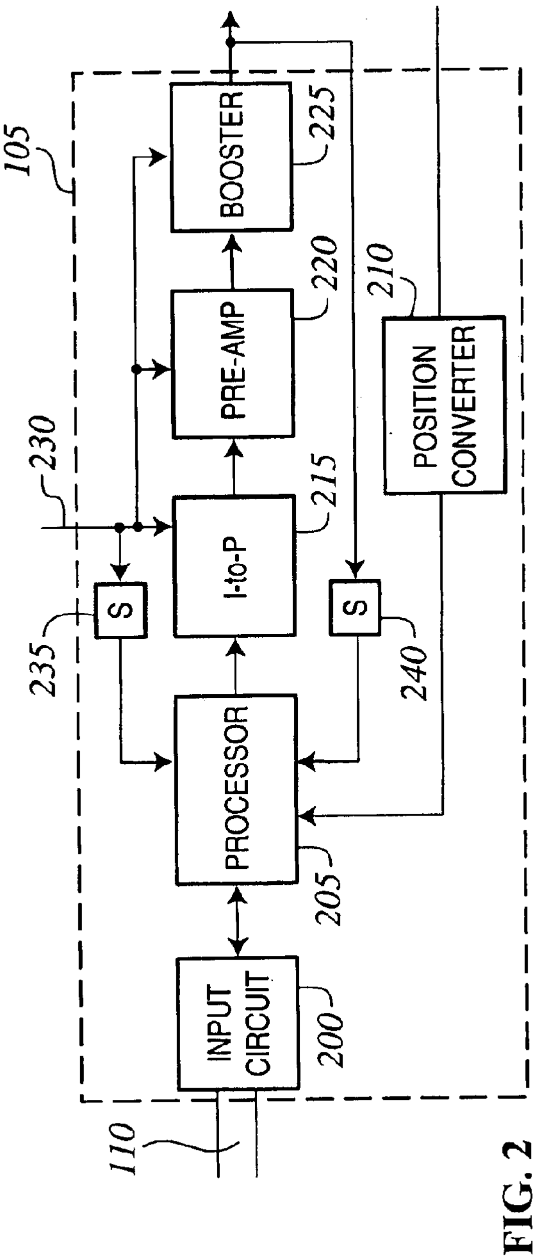
FIG. 2 is a block diagram of the valve controller of the system of FIG. 1.

FIG. 2 provides a more detailed block diagram of the valve controller 105. As shown, an input circuit 200 provides an interface between the two-wire loop 110 and a microprocessor 205. The microprocessor 205 also receives a position signal from a position converter 210, which is a device that is mechanically connected to the valve 125 and which converts the position of the valve into an electrical signal. For example, the position converter 210 may be a potentiometer having an electrical resistance that varies with the position of the valve. The microprocessor 205 implements an algorithm that processes the set value signal from the two-wire loop and the position signal to produce a control signal supplied to a current-to-pressure ("I/P") transducer 215.

The I/P transducer 215 converts the control signal from the microprocessor into air at a pressure proportional to the control signal. This pressurized air is supplied to a preamplifier 220 to increase its pressure, and from there passes to a booster 225 to increase its volume. Both the preamplifier and the booster receive supply air s at, for example, 20–90 psig from a supply line 230. The pneumatic pressure at the output of the booster is supplied to the actuator 120.

The valve controller 105 may optionally include pressure sensors 235, 240. Pressure sensor 240 monitors the pressure at the output of the booster 225, and pressure sensor 235 monitors the pressure from the supply line 230. The respective electrical outputs of the pressure sensors are provided to the microprocessor, which uses them in diagnostic testing of one or more of the valve controller 105 and the valve 125.

Figure 3:
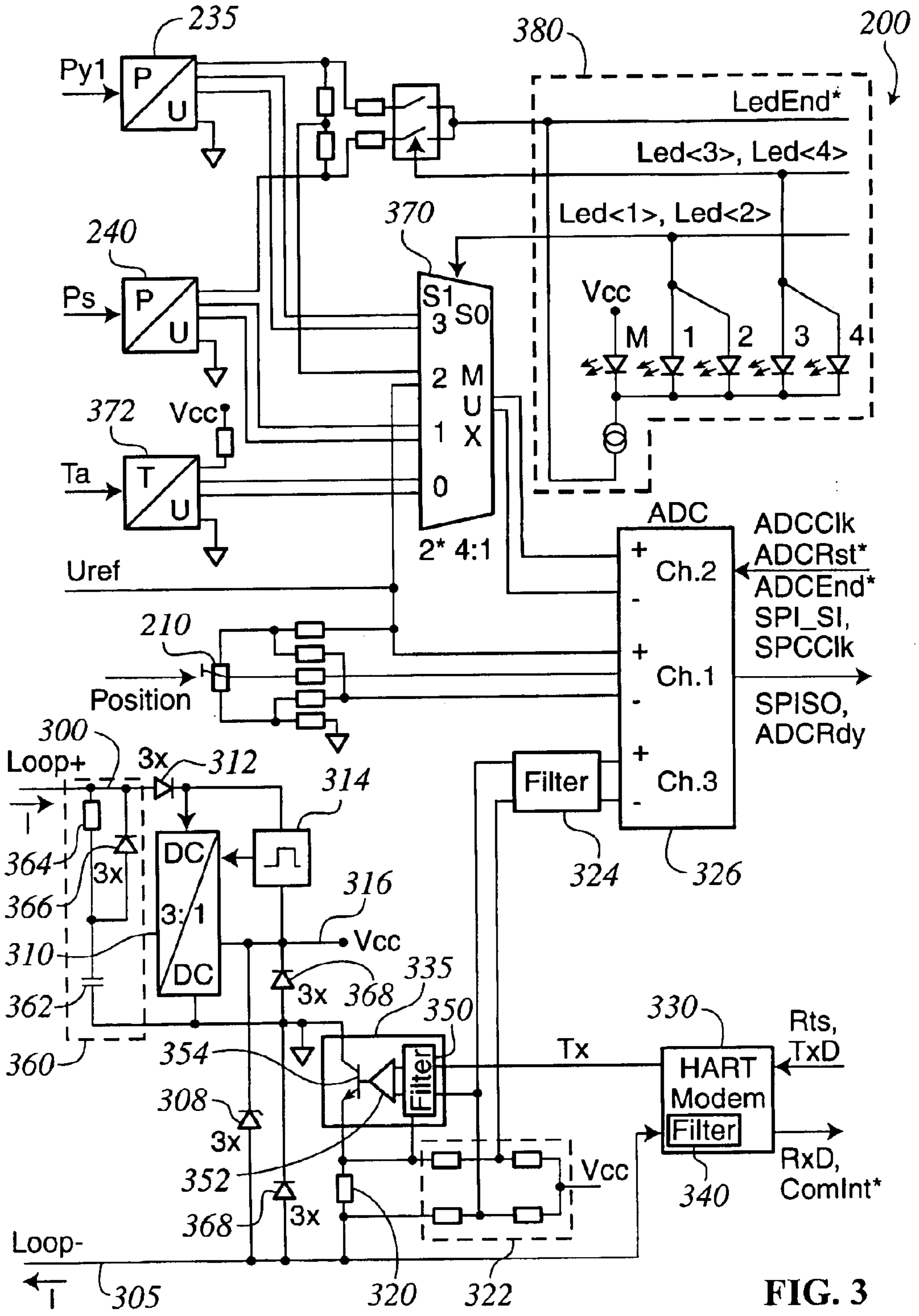
FIG. 3 is a block diagram of input circuitry of the valve controller of FIG. 2.

FIG. 3 illustrates the input circuit 200 of the valve controller 105 in more detail. As shown, Loop+ and Loop− designate, respectively, the terminal connections 300, 305 to the two-wire control loop.

Power for the valve controller 105 is extracted from the control loop using circuitry including a DC-to-DC converter 310. The converter 310 provides a 3:1 reduction in the loop voltage, which is typically on the order of 10 Volts. A diode 312 rectifies the input to the converter 310 and to an oscillator 314. The oscillator 314 controls the converter 310 to provide a fixed, 3 Volt supply voltage 316 (Vcc) for use by other components of the controller 105.

The analog control current on the control loop is monitored by a 21 Ohm measurement resistor 320 that produces a voltage proportional to the loop current. A bridge circuit 322 and a filter 324 provide this voltage to an analog-to-digital converter 326 that converts the voltage to a digital value for use by the microprocessor 205.

Bi-directional digital communications are handled by the combination of a HART modem 330 and an impedance controller 335. For the reception of digital communications signals, the HART modem 330 includes a filter 340 that detects high frequency FSK variations in the loop current. When these variations, which typically have magnitudes on the order of 1 mA, are detected, the modem 330 converts frequency content of the variations in to a digital reception signal (RxD) and generates a communications interrupt (ComInt*). The modem then supplies both of these signals to the microprocessor 205.

The HART modem 330 initiates transmission of a digital signal in response to a request to send signal (Rts) and a digital packet (TxD) describing the desired transmission from the microprocessor 205. In particular, the HART modem 330 transmits a signal (Tx) to the impedance controller 335 in the form of a 0.25 V FSK AC signal in combination with a 0.25 V DC offset such that the signal Tx varies between 0 and 0.5 V.

Figure 4:
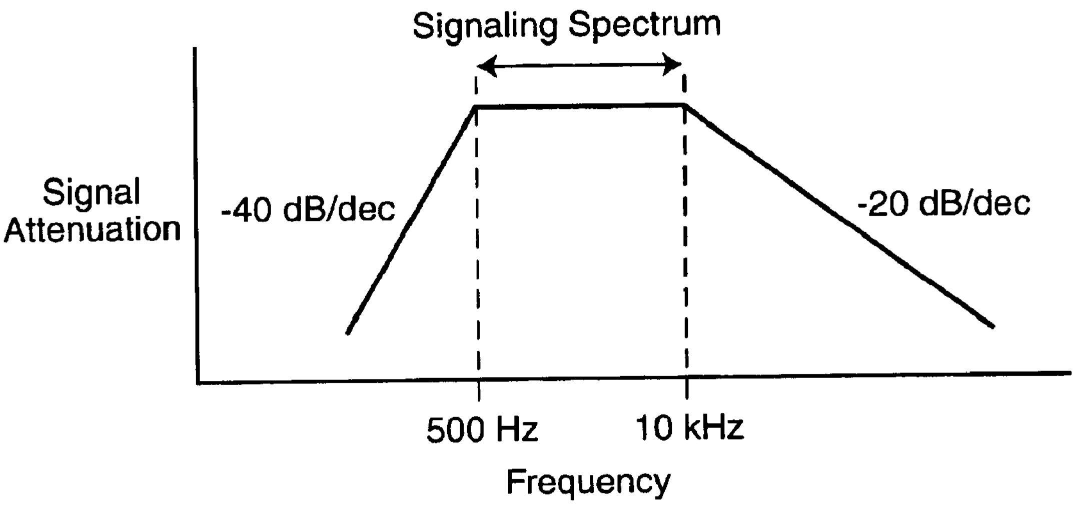
FIG. 4 is a graph of frequency characteristics of the input circuitry of FIG. 3.
Figure 5A:
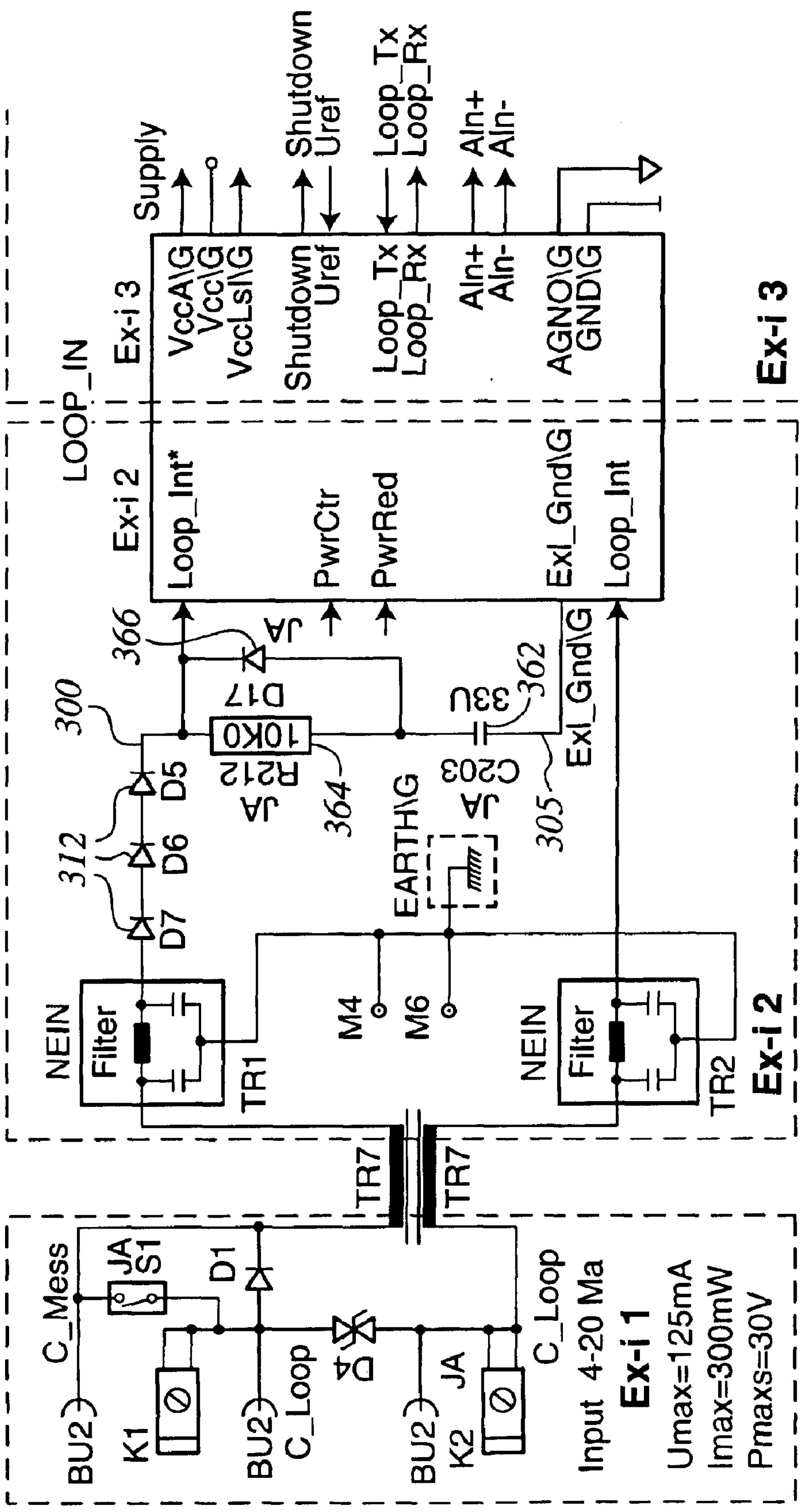
FIGS. 5–10 are circuit diagrams of the valve controller of FIG. 2.
Figure 5B:
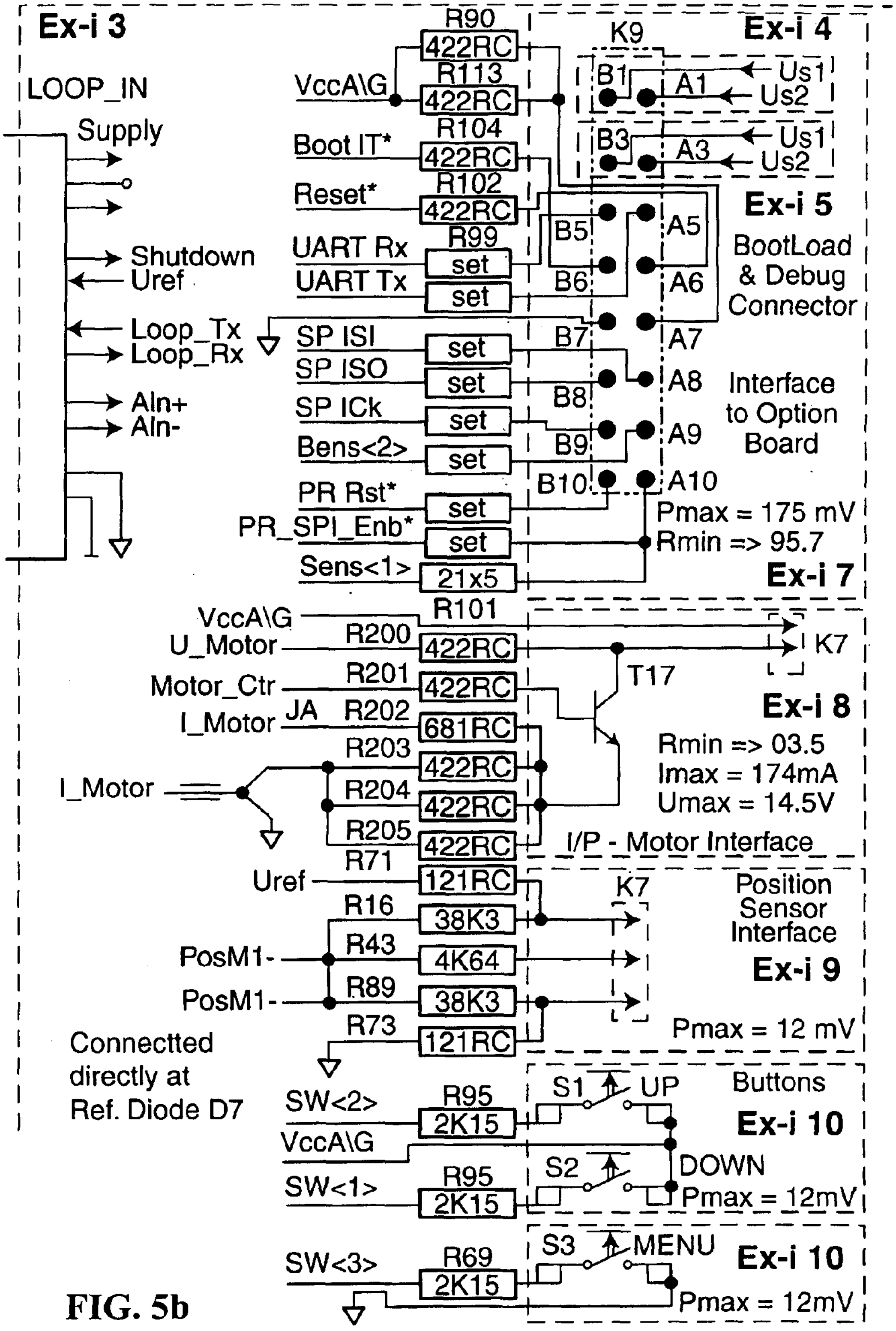
Figure 5C:
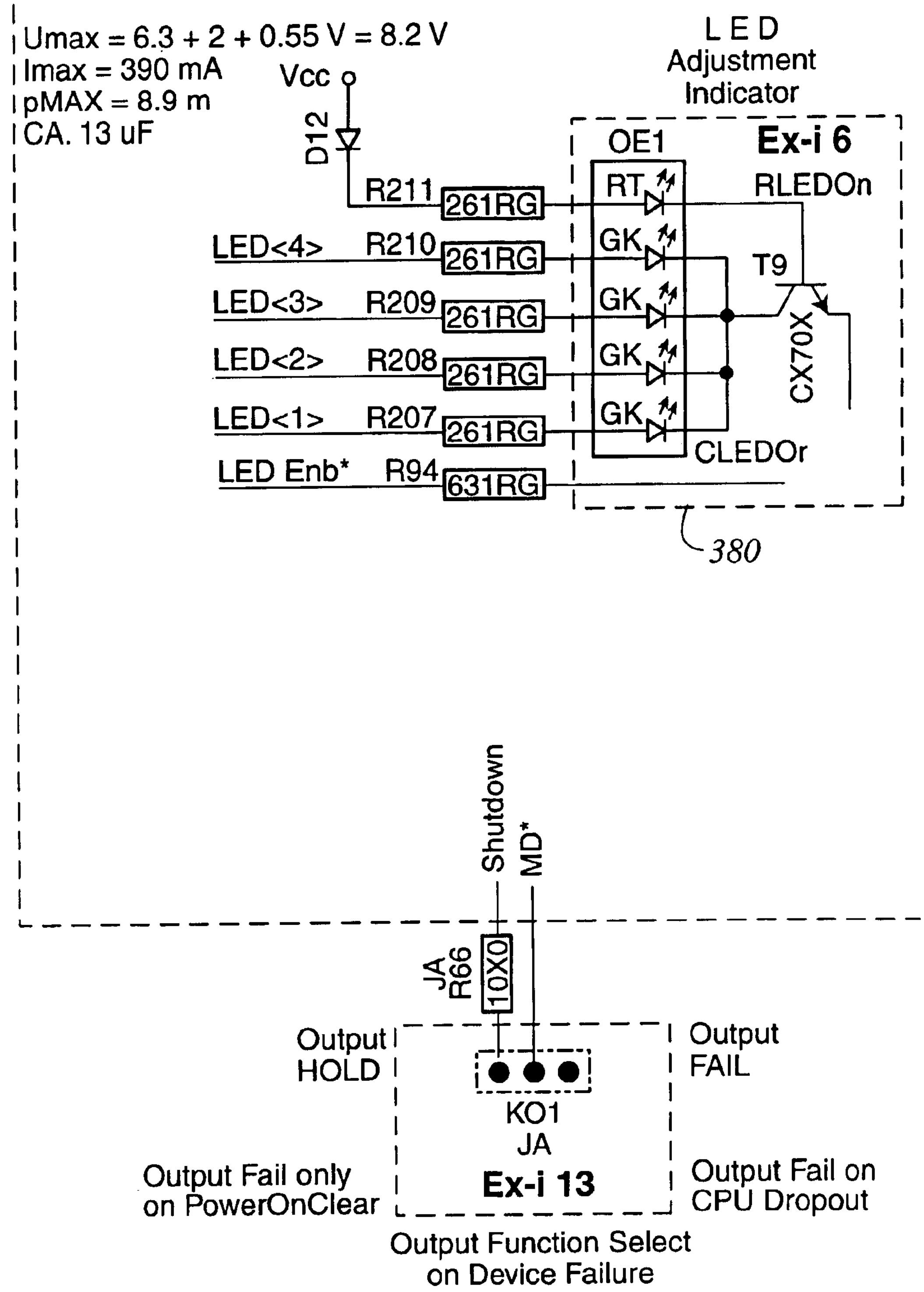
Figure 5D:
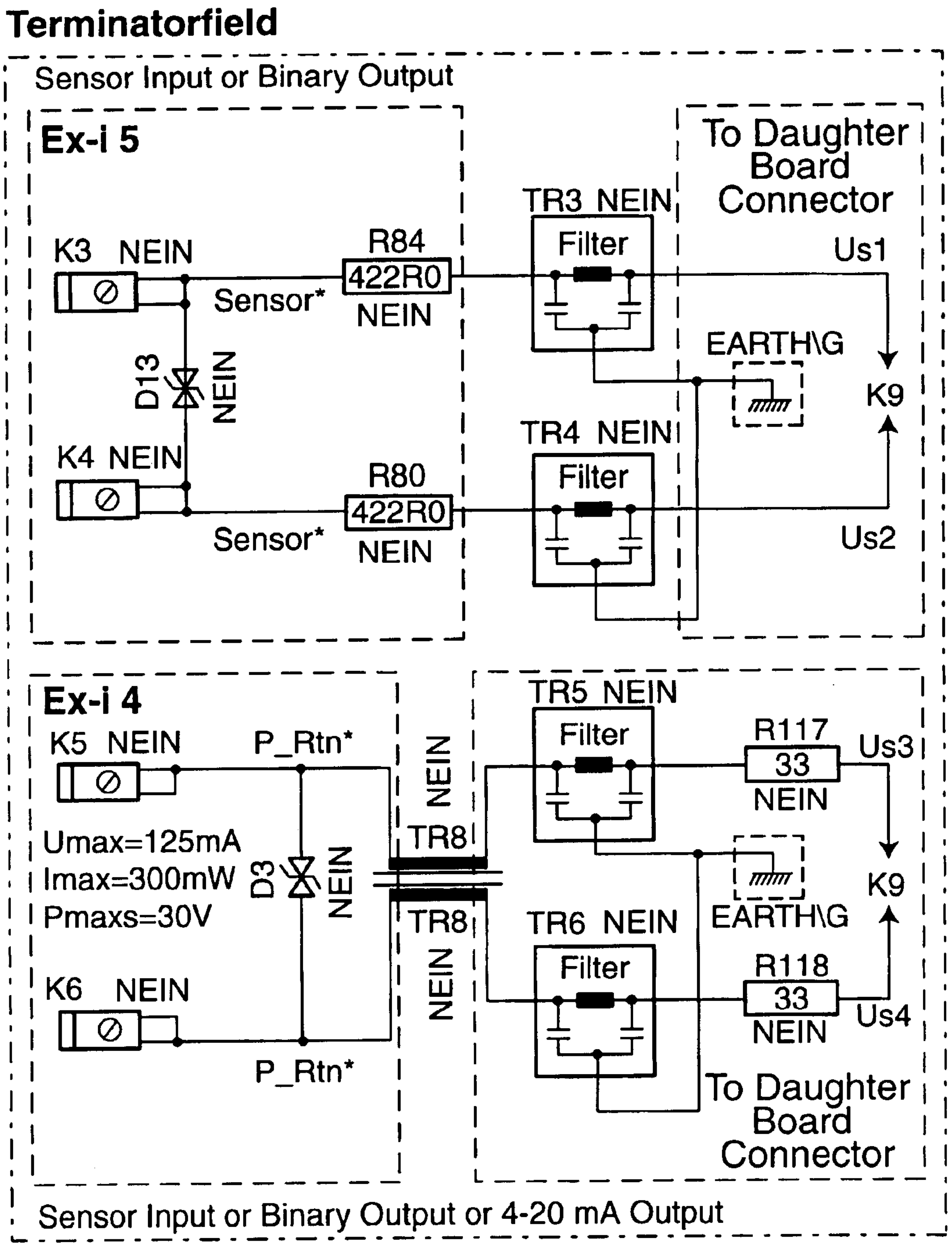
Figure 5E:
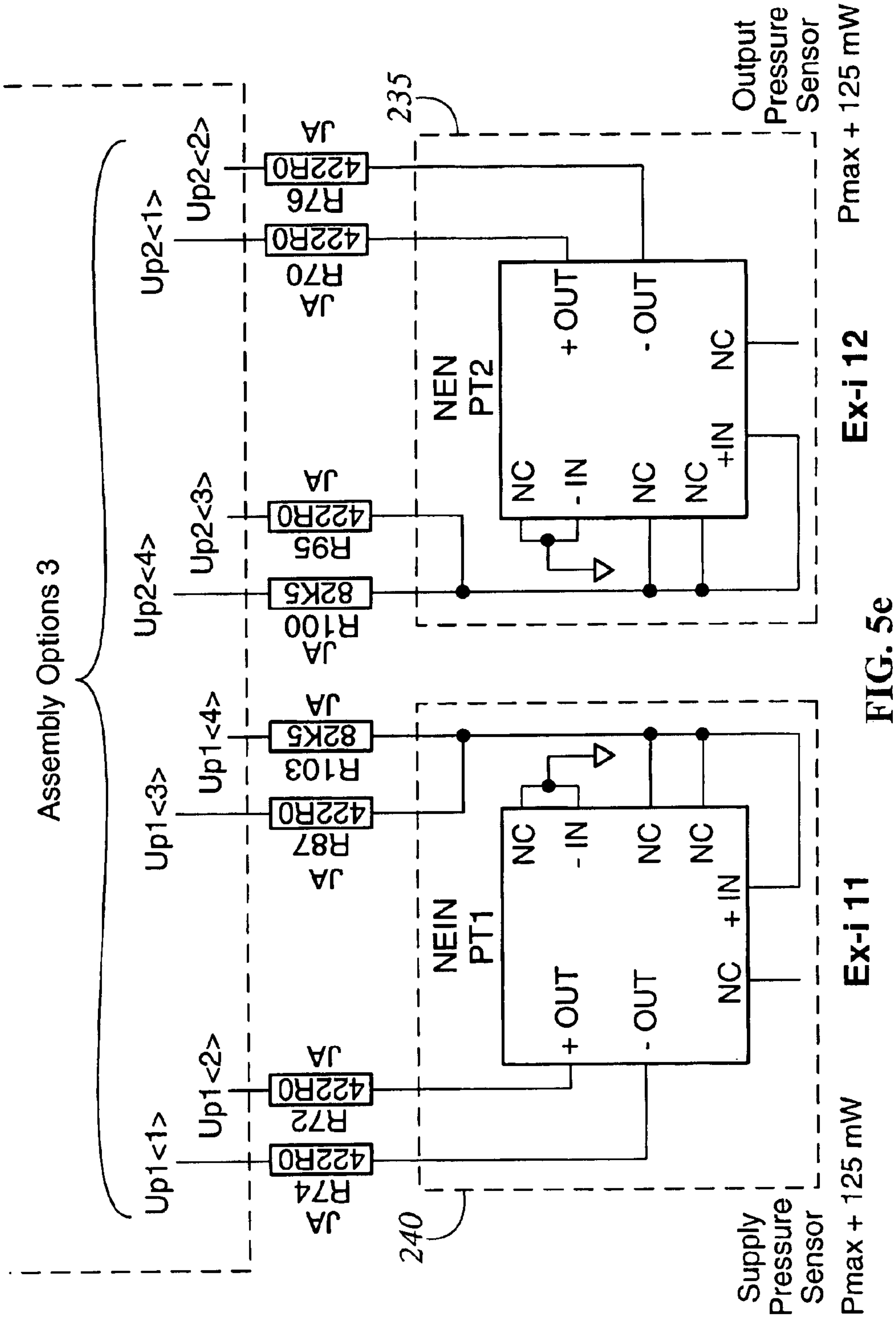
Figure 6A:
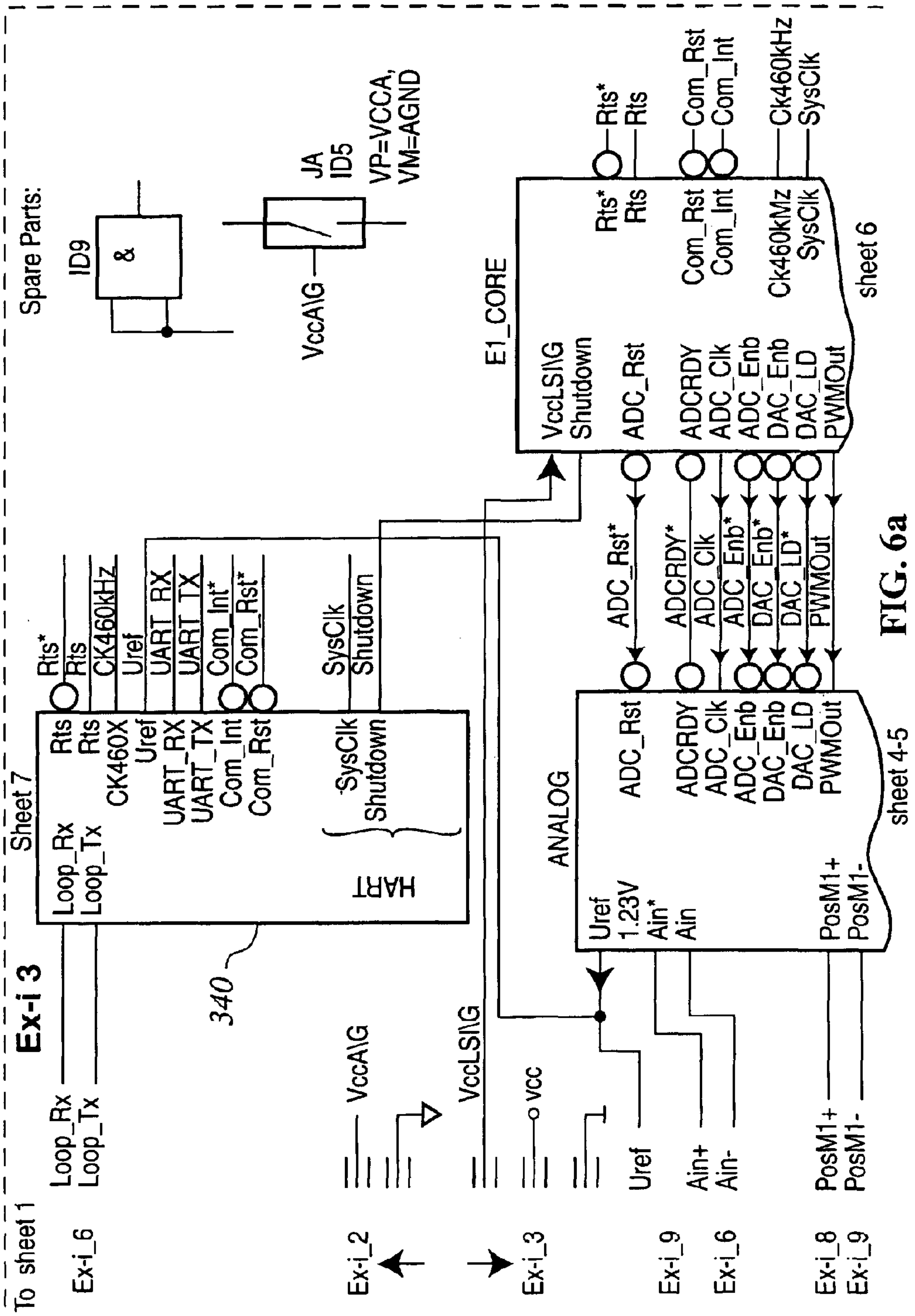
Figure 6B:
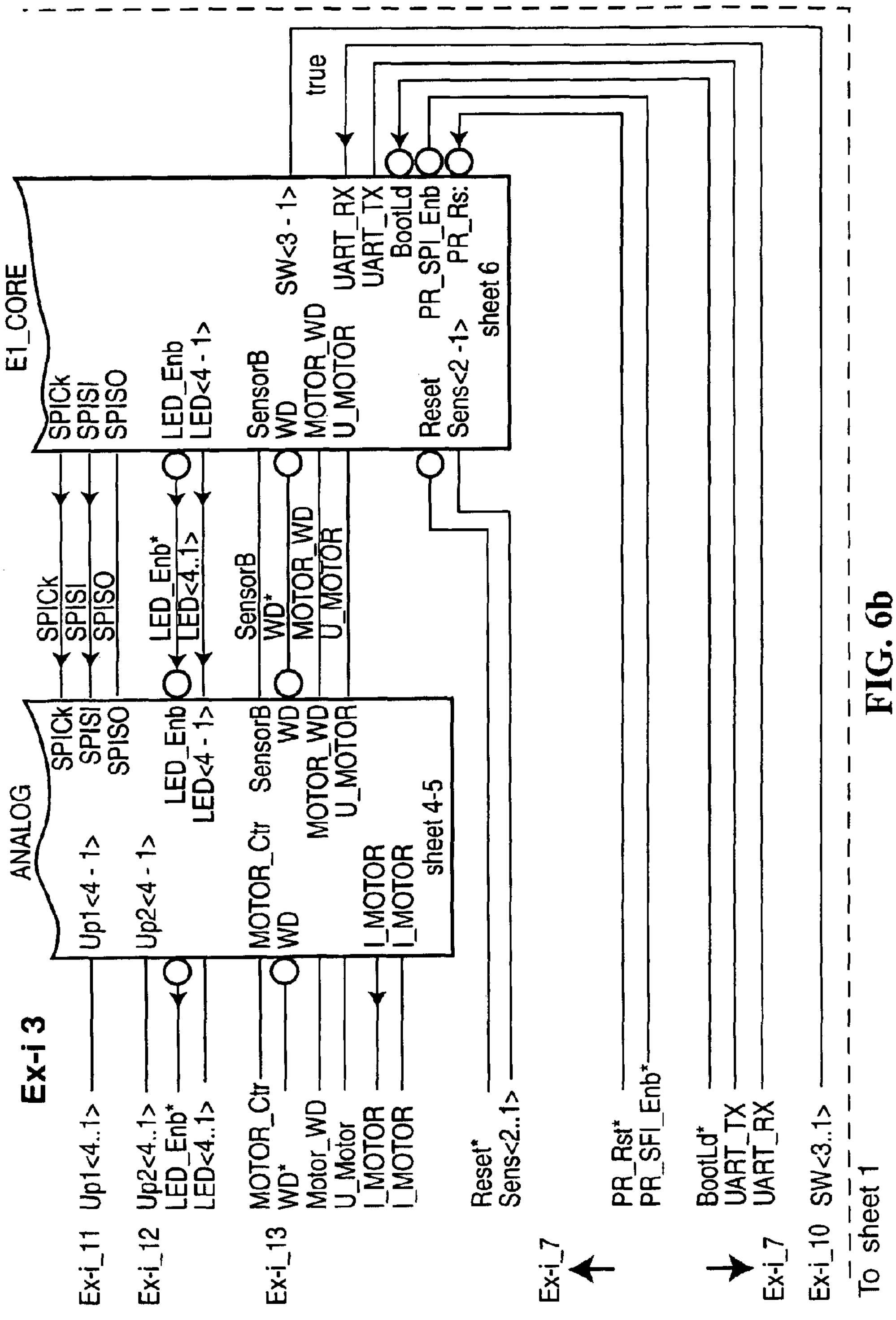
Figure 7A:
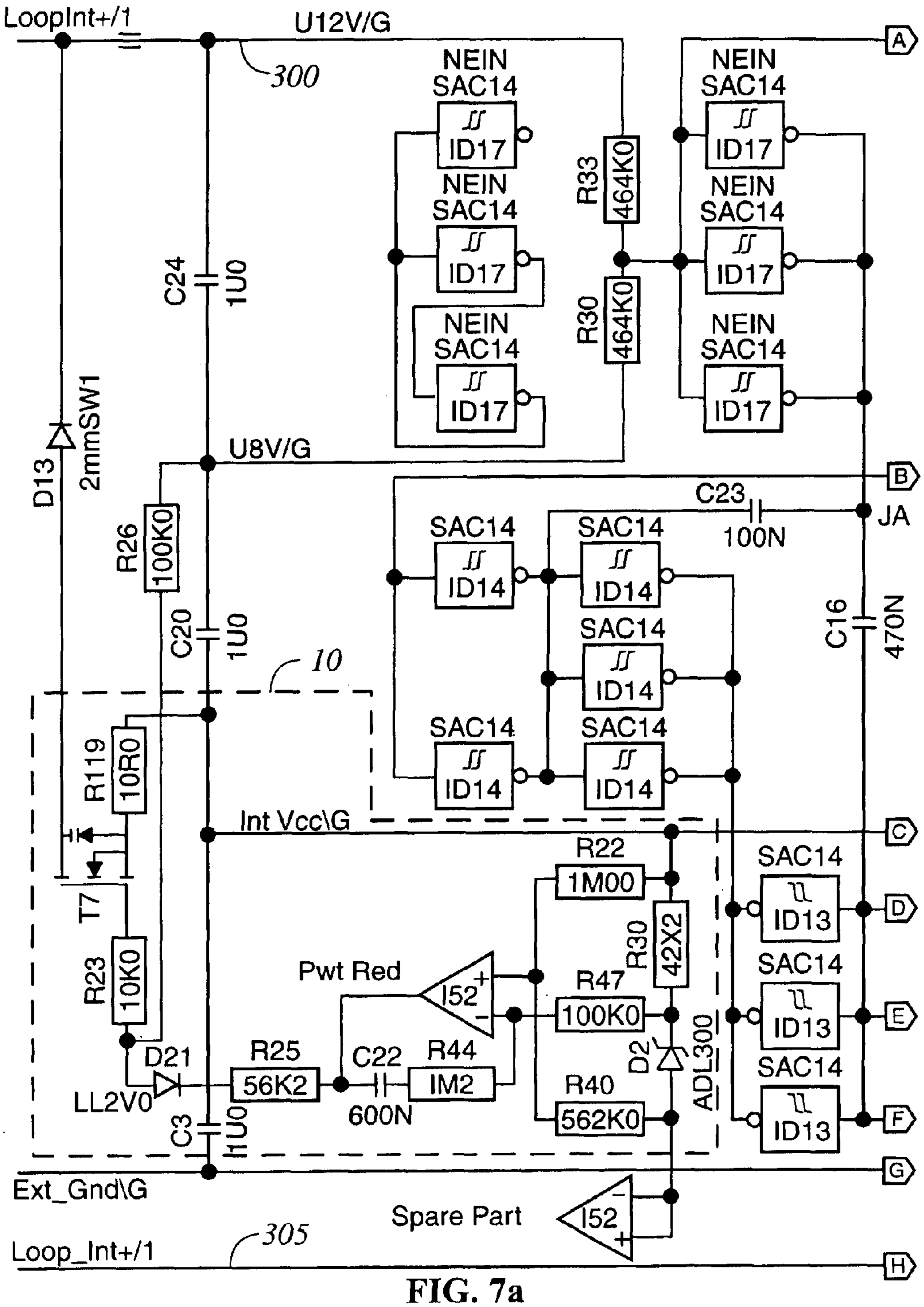
Figure 7B:
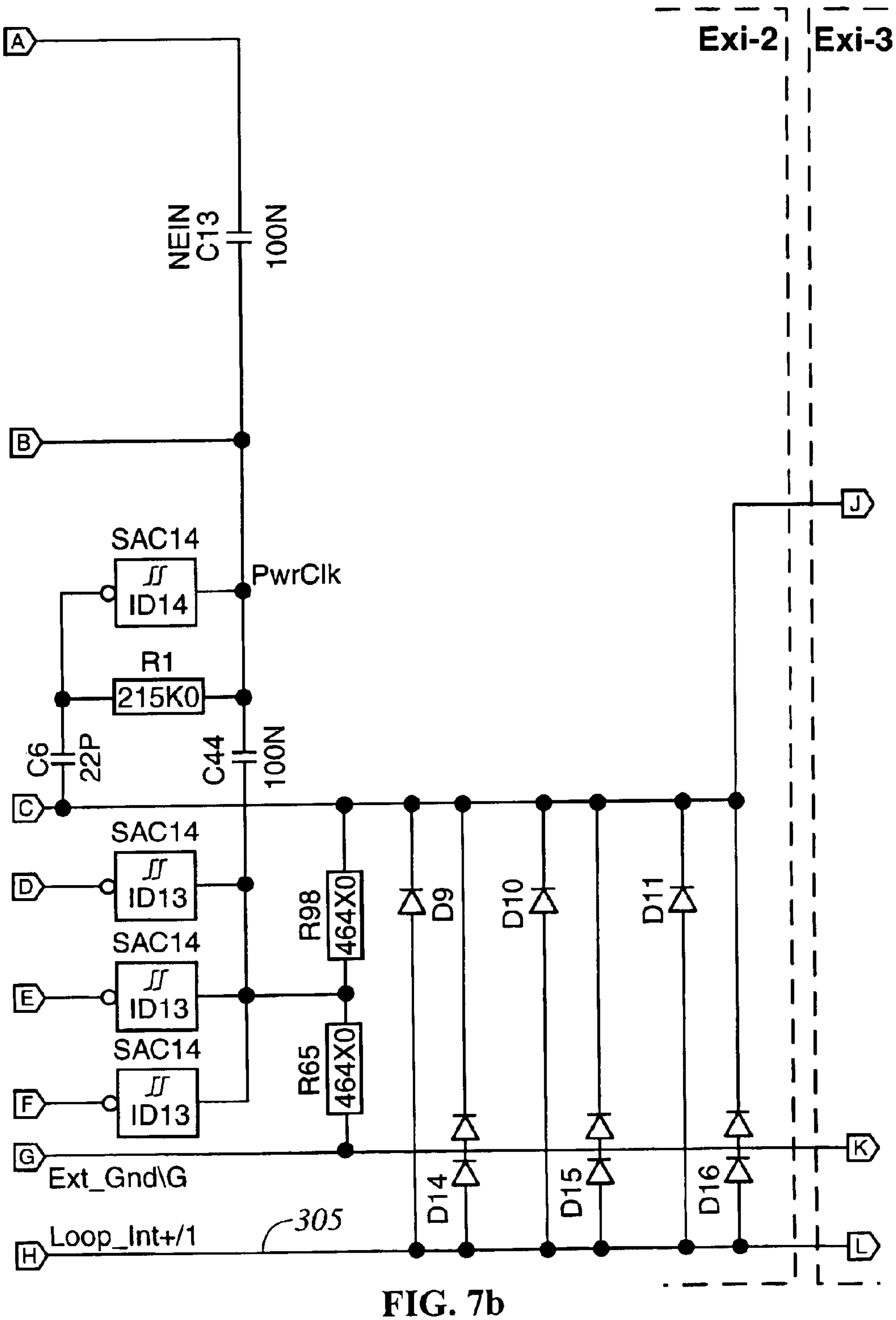
Figure 7C:
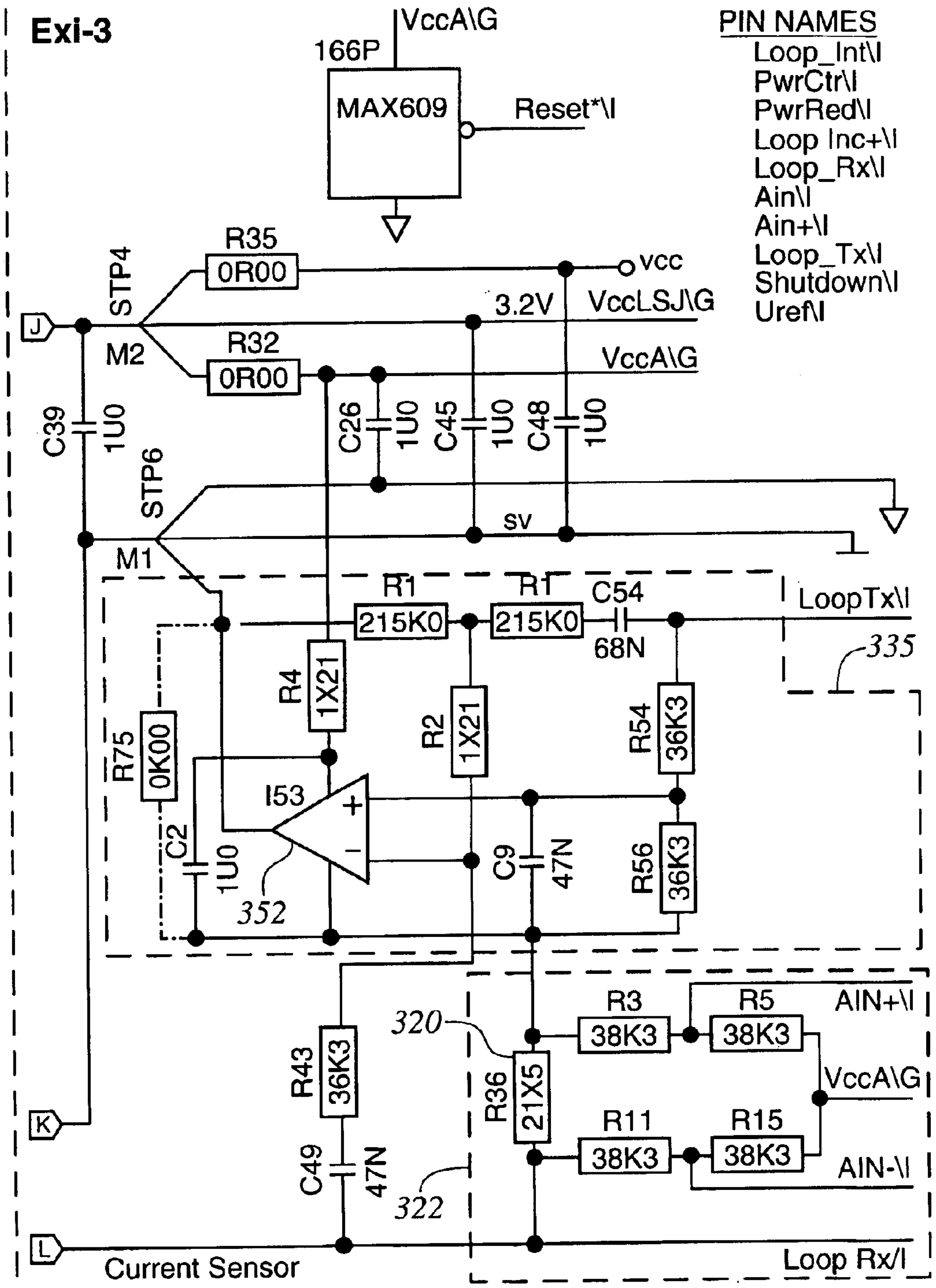
Figure 8A:
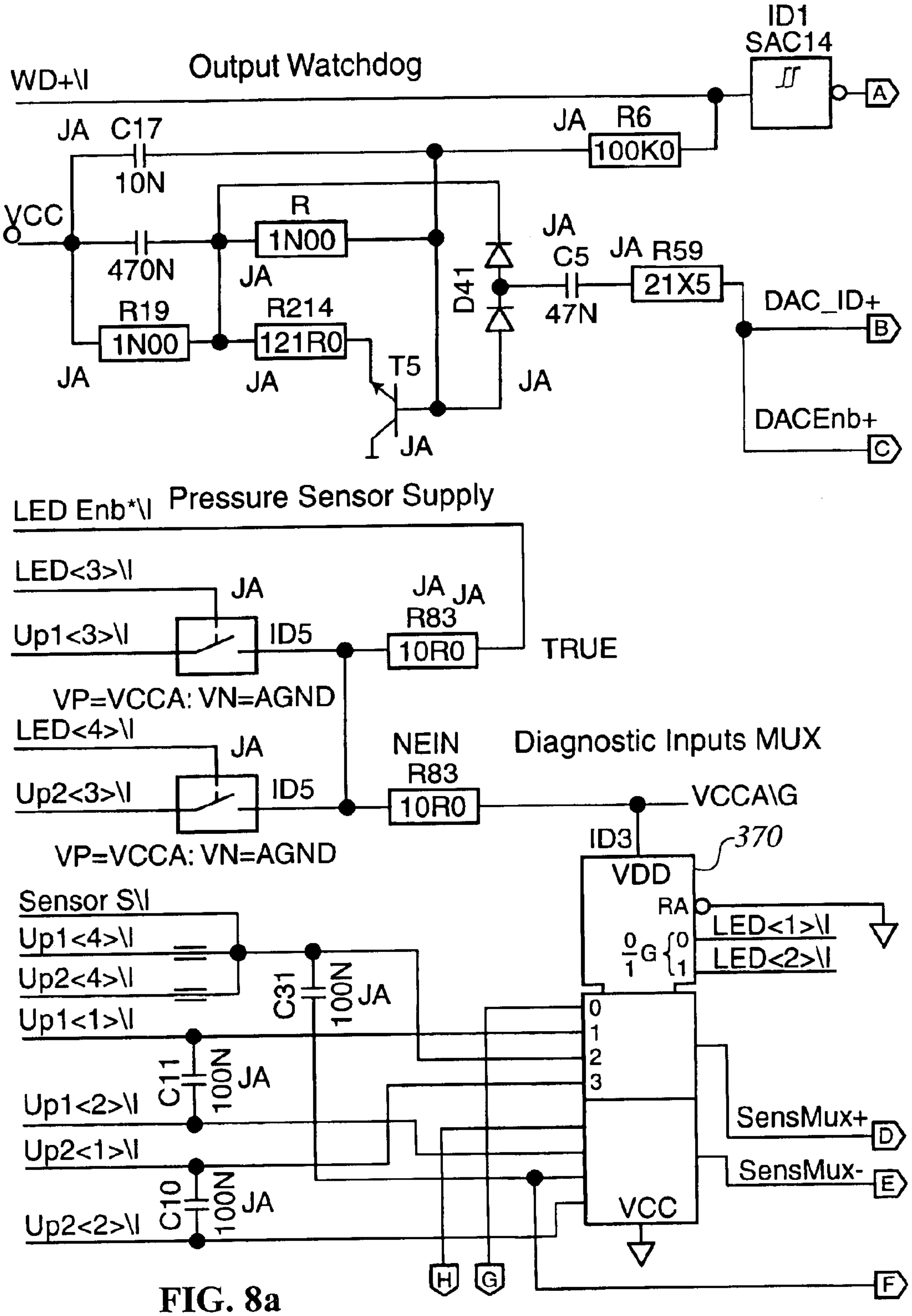
Figure 8B:
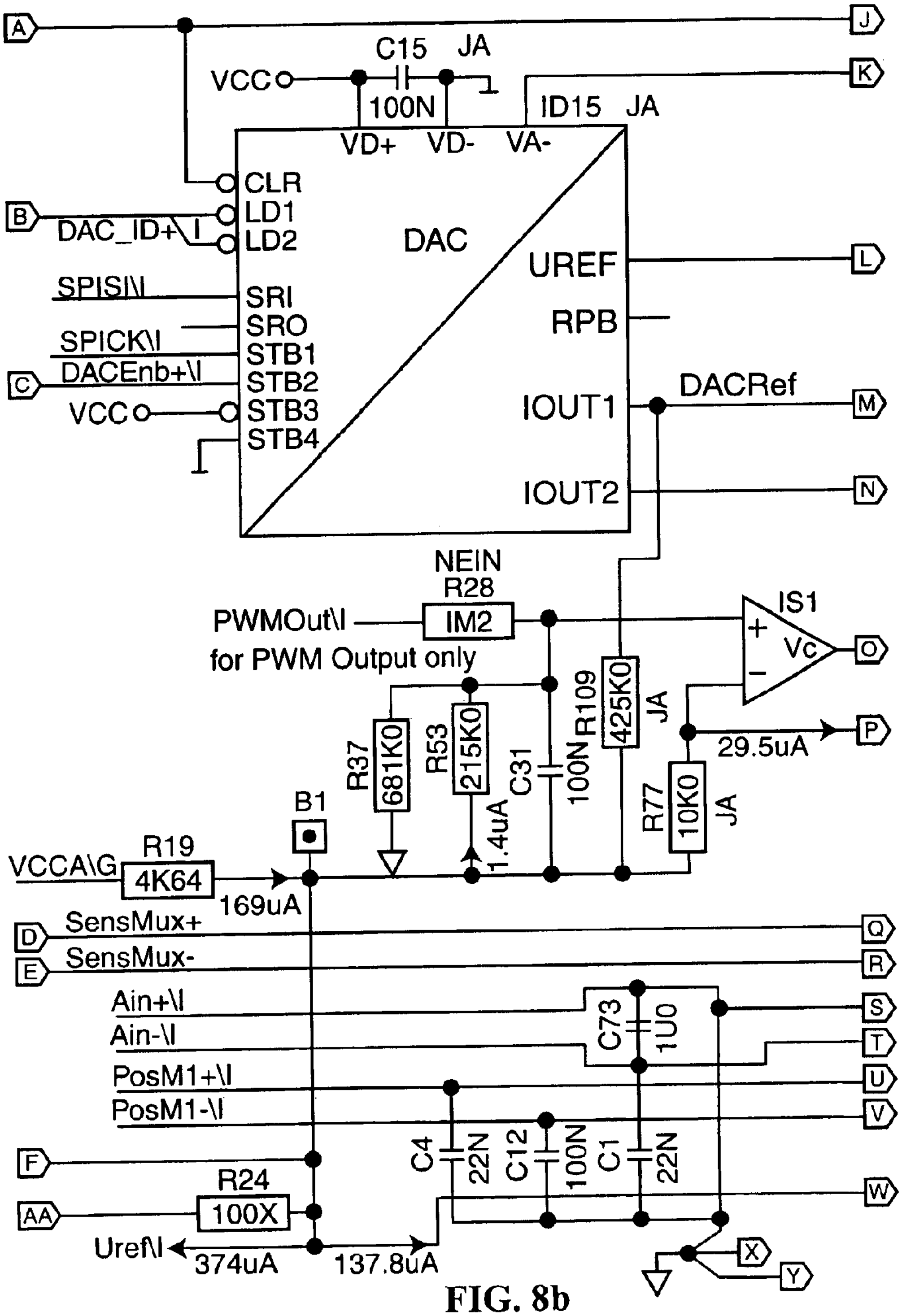
Figure 8C:
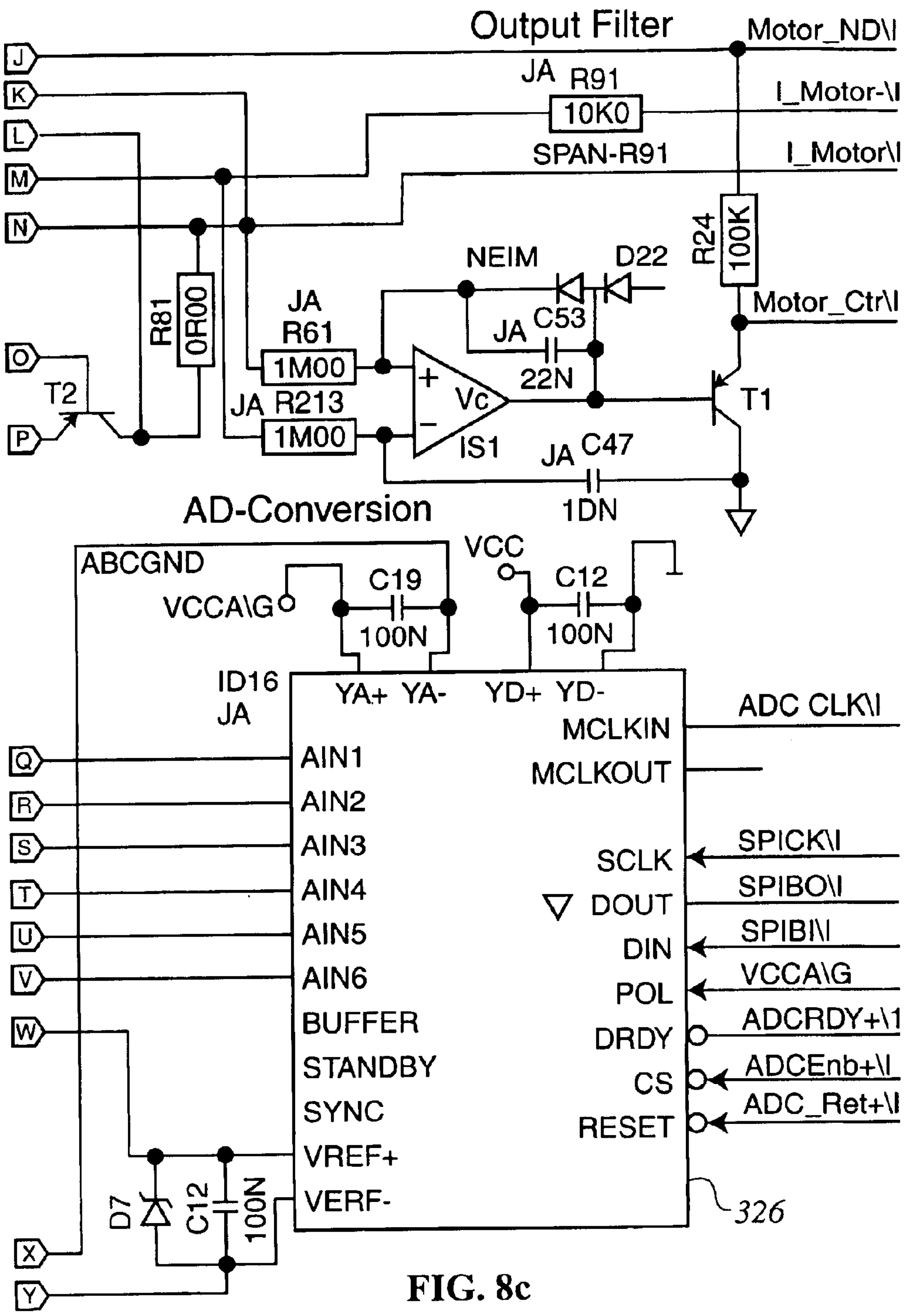
Figure 8D:
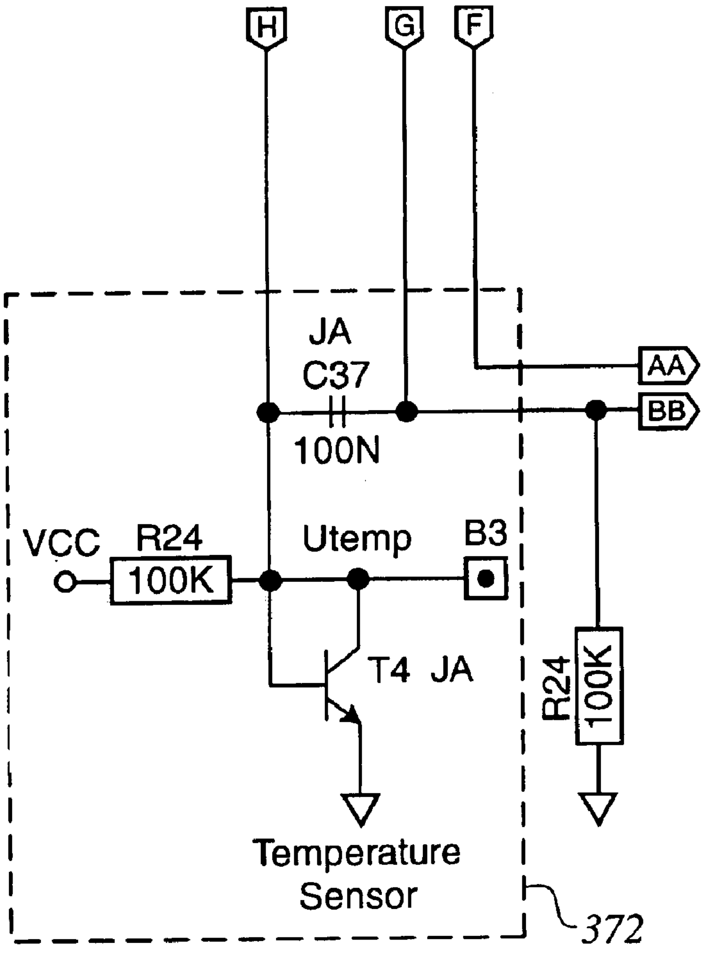
Figure 9A:
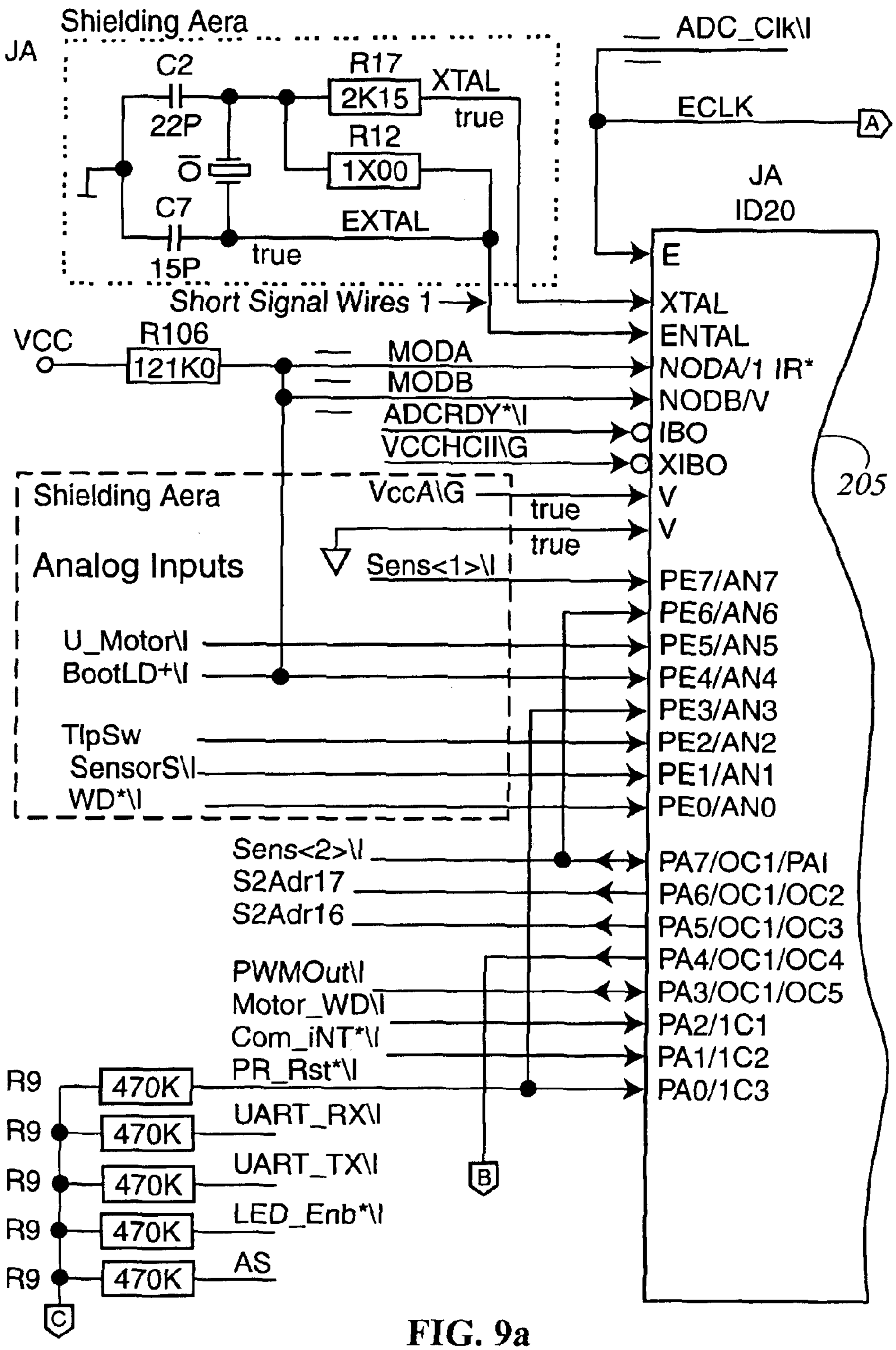
Figure 9B:
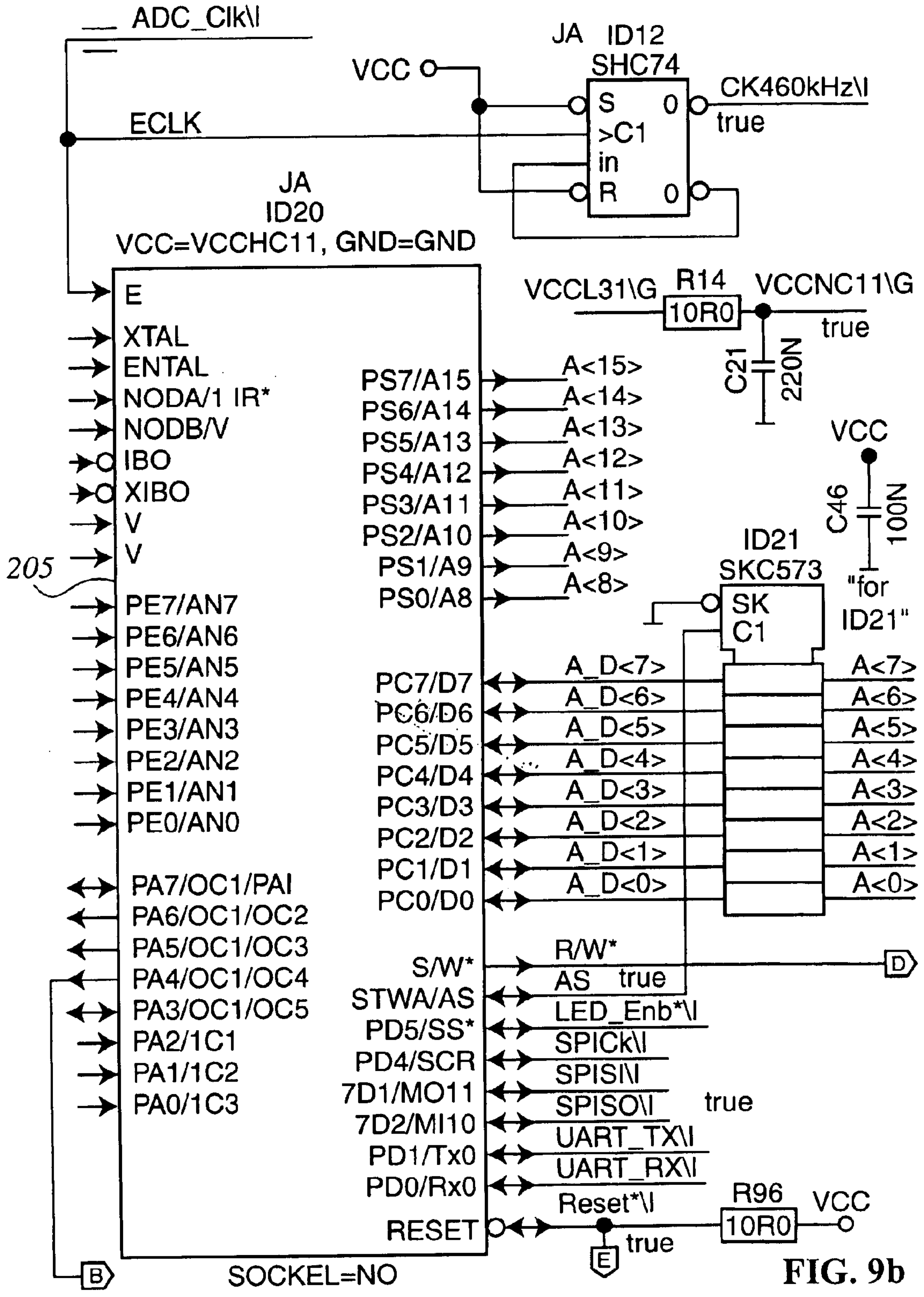
Figure 9C:
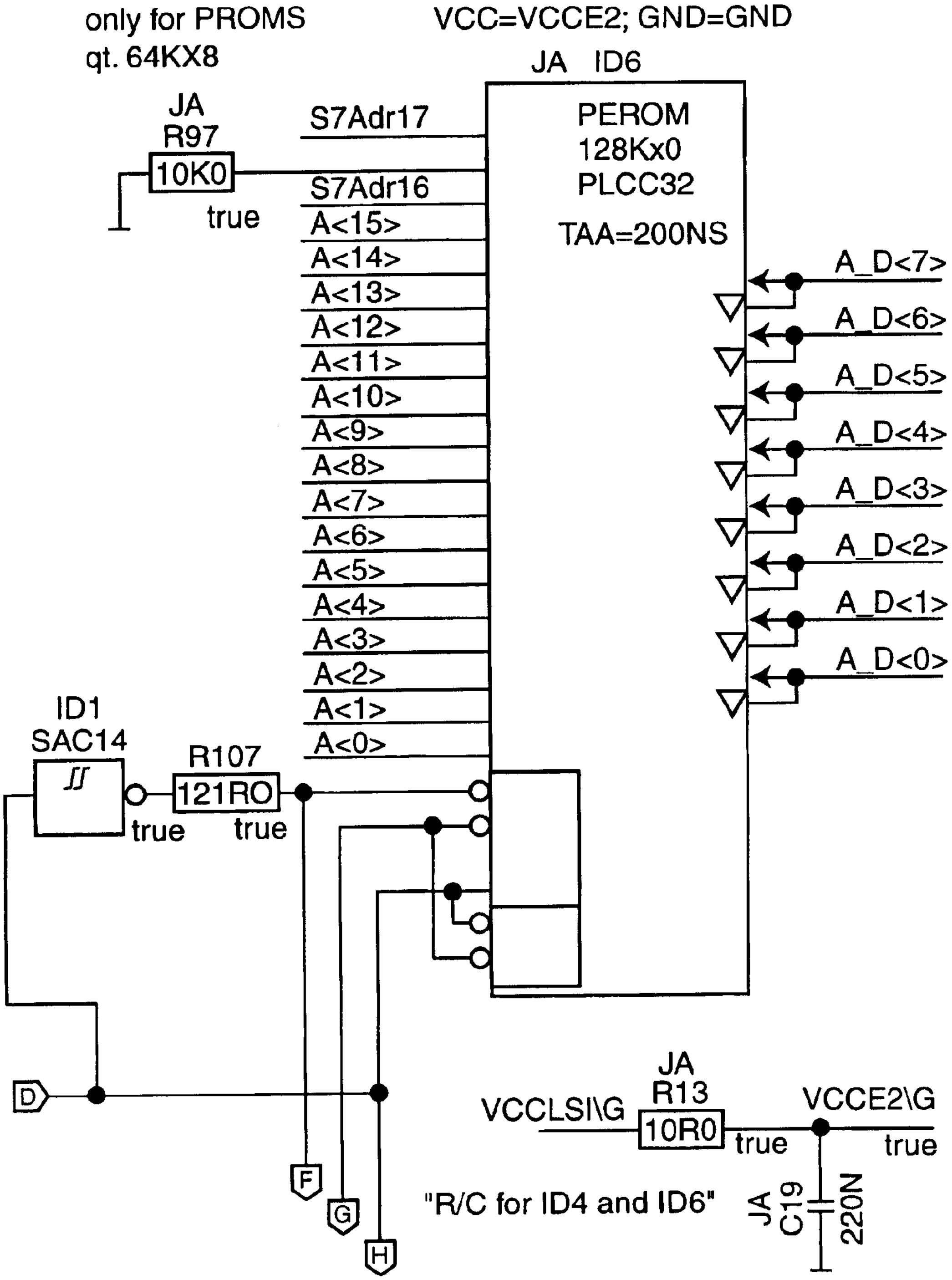
Figure 9D:
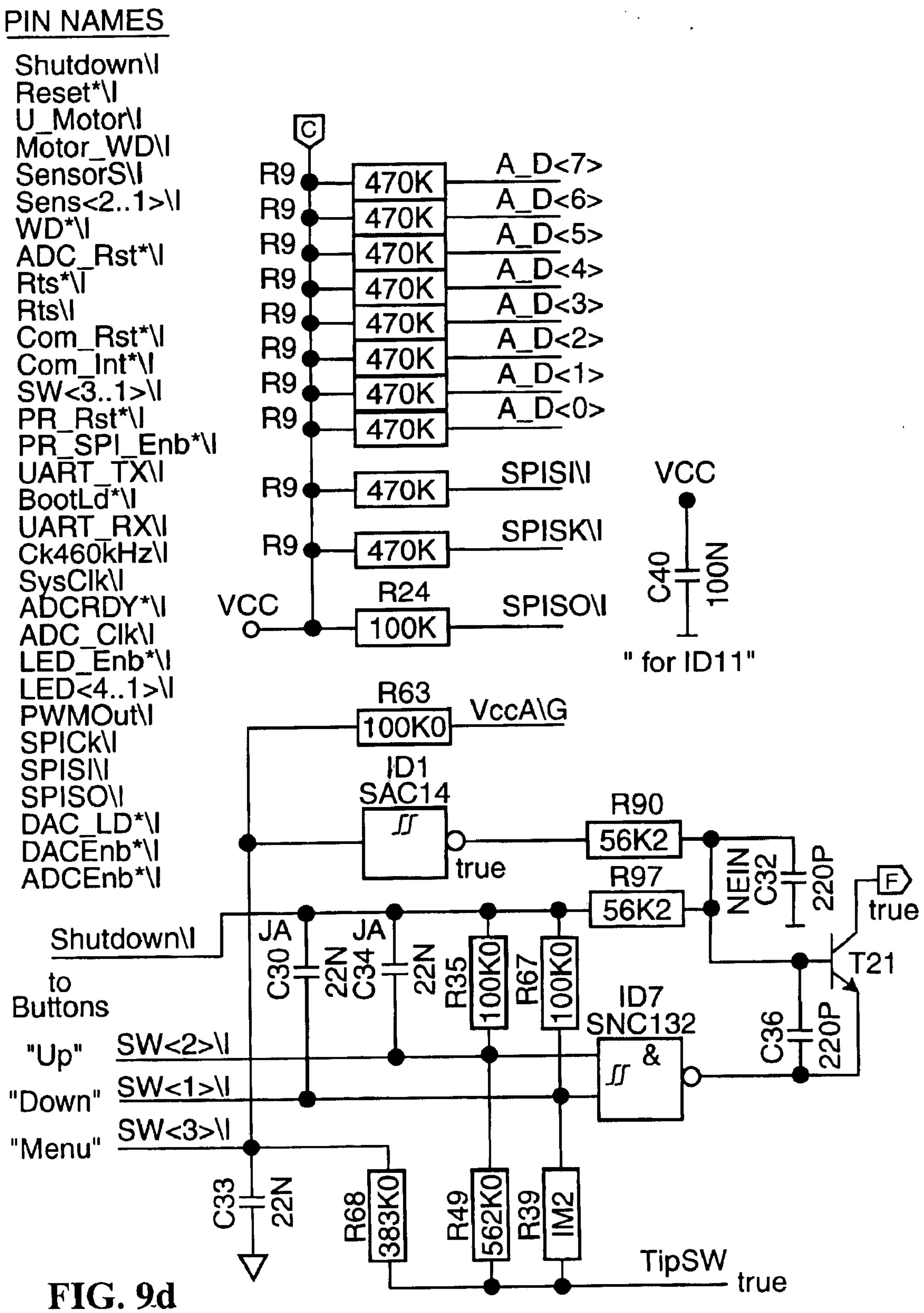
Figure 9E:
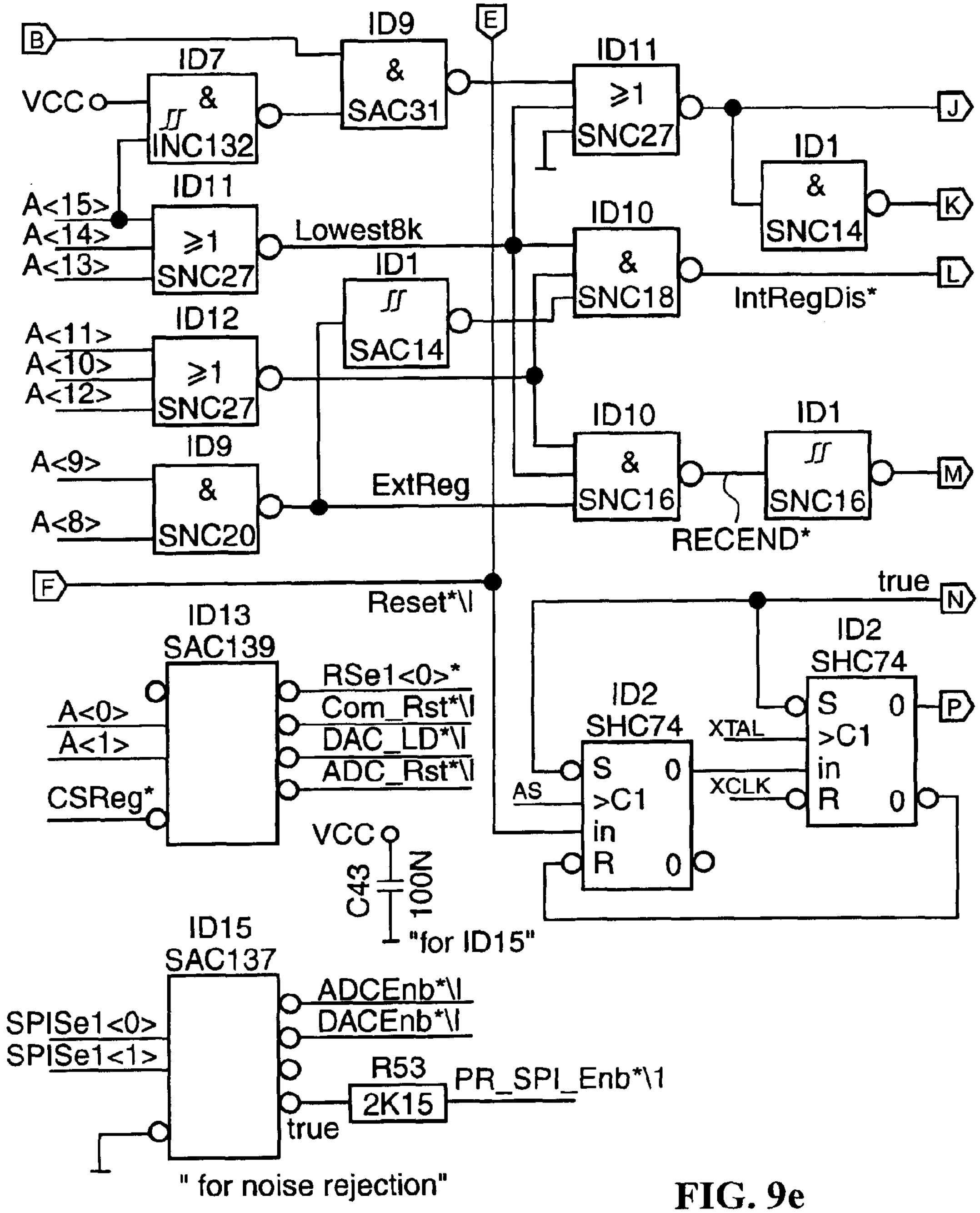
Figure 9F:
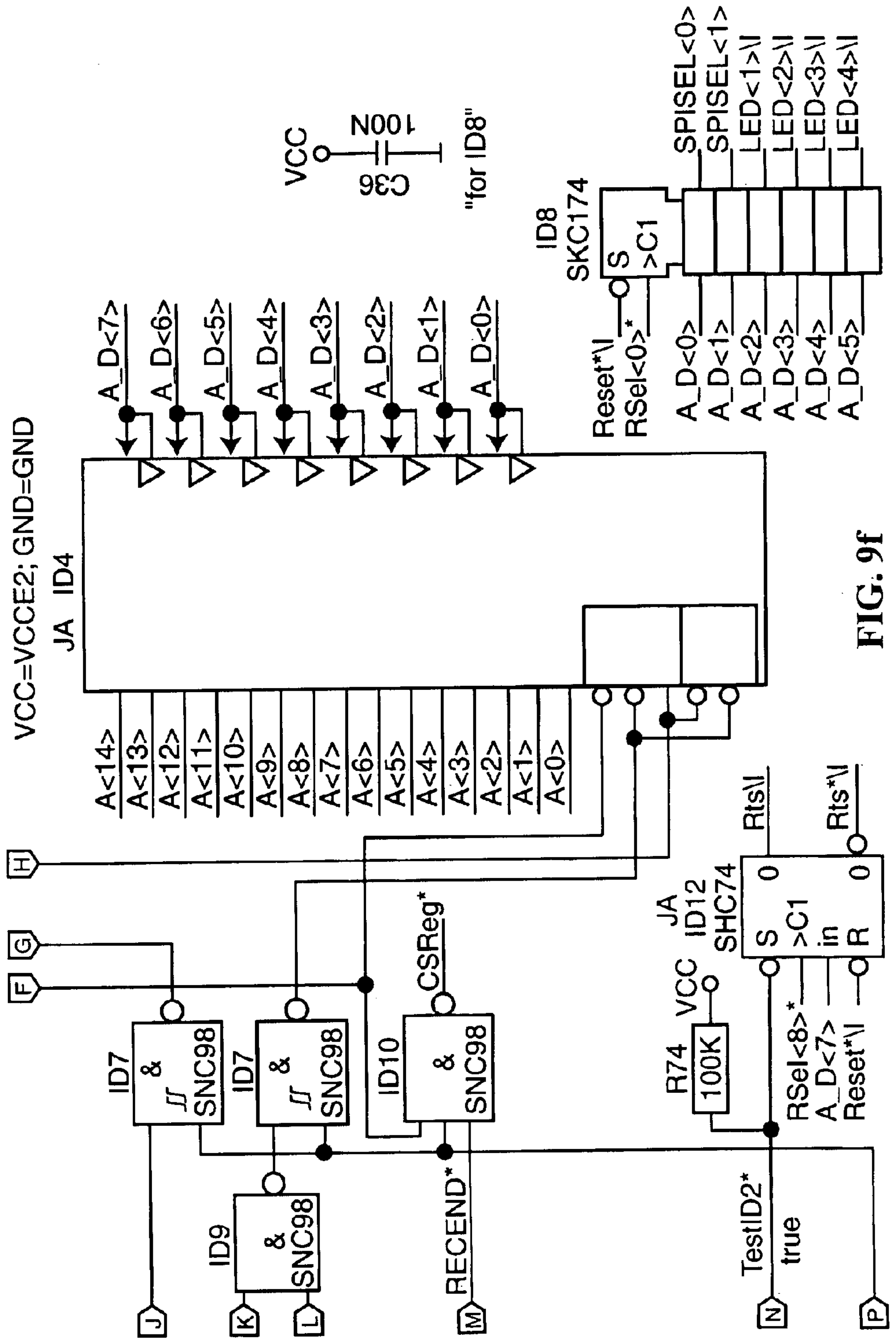
Figure 10:
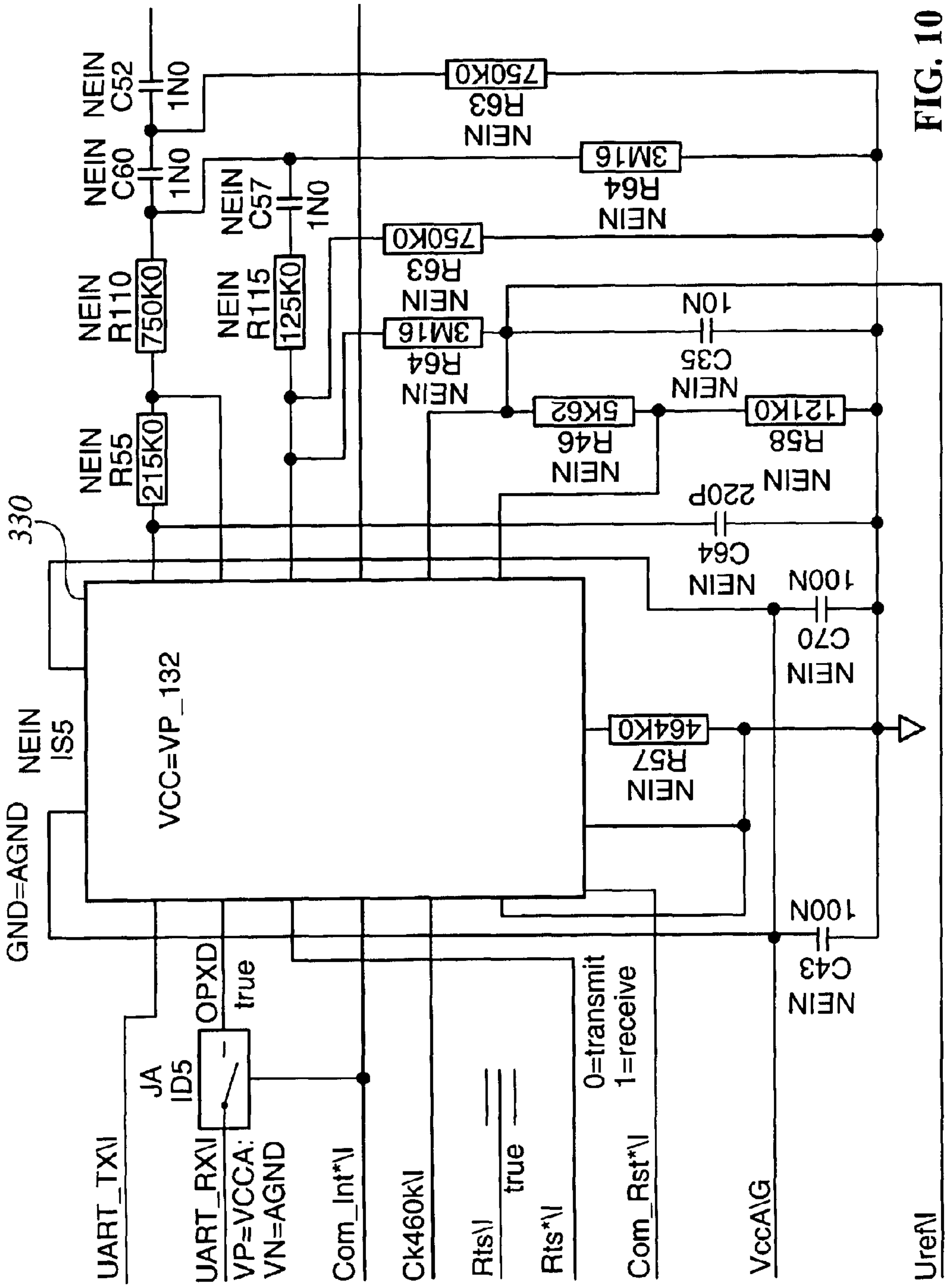

The impedance controller 335 provides an impedance on the order of 250 Ohms in the digital signaling spectrum, which extends from 500 Hz to 10 kHz. The impedance drops quickly for frequencies below 500 Hz and greater than 10 kHz. This permits the input circuit to present the signal attenuation characteristics illustrated in FIG. 4.

The impedance controller 335 includes a filter 350 that acts as the input to a operational amplifier (op amp) 352. The voltage drop across the transistor is normally 0.5 V. However, variations in Tx cause the voltage drop to vary and thereby impose a FSK AC signal on the loop voltage.

The filter 350 also receives a voltage corresponding to the loop current (i.e., the voltage across the resistor 320). The filter 350 uses this voltage to maintain the impedance of the valve controller 105 such that the valve controller 105 presents the desired impedance.

A bypass circuit 360, which includes a capacitor 362 in series with the parallel combination of a resistor 364 and a diode 366, permits higher frequency components of the loop signal to bypass the converter 310. Diodes 368 are used in providing intrinsically safe operation.

A multiplexer 370 receives inputs from the pressure sensors 235, 240, as well as from a temperature sensor 372. The multiplexer selectively provides these inputs to a second channel of the A-to-D converter 326. A third channel of the A-to-D converter is connected to the position converter 210.

An LED driver circuit 380 drives a set of light emitting diodes (LEDs). The LEDs provide local indications of the operations being performed by the valve controller 105. For example, the LEDs can provide an indication that a value is being obtained from the pressure sensor 235.

An actual implementation of the valve controller circuitry is illustrated in the circuit diagrams of FIGS. 5–10. Corresponding elements from FIGS. 2 and 3 are indicated in the circuit diagrams.

Other embodiments are within the scope of the following claims.

What is claimed is:

1. A 4–20 mA input interface circuit for communicating with a two-wire loop, the interface circuit including:

a power extraction circuit connected to the two-wire loop and operable to generate a DC operating voltage for use in powering the interface circuit and a related device, the power extraction circuit including a DC-to-DC converter that generates the DC operating voltage as a voltage having a smaller magnitude than a voltage between the two wires of the two-wire loop;

a current sensor connected to the two-wire loop and operable to generate a measure of an analog current through the two-wire loop, the measure being used in controlling a device associated with the interface circuit; and a digital communications circuit connected to the two-wire loop and operable to inject a digital transmission signal on to the two-wire loop and to extract a digital reception signal from the two-wire loop, the digital communications circuit including an impedance controller having an operational amplifier connected to control an impedance presented to the two-wire loop by the interface circuit.

2. The interface circuit of claim 1, wherein the impedance controller is operable to present a stable impedance to the two-wire loop for frequencies in a digital communications band.

3. The interface circuit of claim 2, wherein the impedance controller presents an impedance substantially less than the stable impedance for frequencies outside of the digital communications band.

4. The interface circuit of claim 2, wherein the stable impedance is between 200 and 300 ohms.

5. The interface circuit of claim 4, wherein the stable impedance is 250 ohms.

6. The interface circuit of claim 2, wherein the digital communications band extends from 500 Hz to 10 kHz.

7. The interface circuit of claim 2, wherein the impedance controller is operable to inject the digital transmission signal without reducing the impedance substantially below the stable impedance.

8. The interface circuit of claim 1, wherein the impedance controller includes a filter connected to one or more inputs of the operational amplifier.

9. The interface circuit of claim 1, wherein the impedance controller is connected to receive an AC signal having a varying frequency, the varying frequency corresponding to digital content of the digital transmission signal.

* * * * *